April 9, 1940.                    Z. HOLLÓS                    2,196,556
VEHICLE AXLE SUSPENSION
Filed July 6, 1937
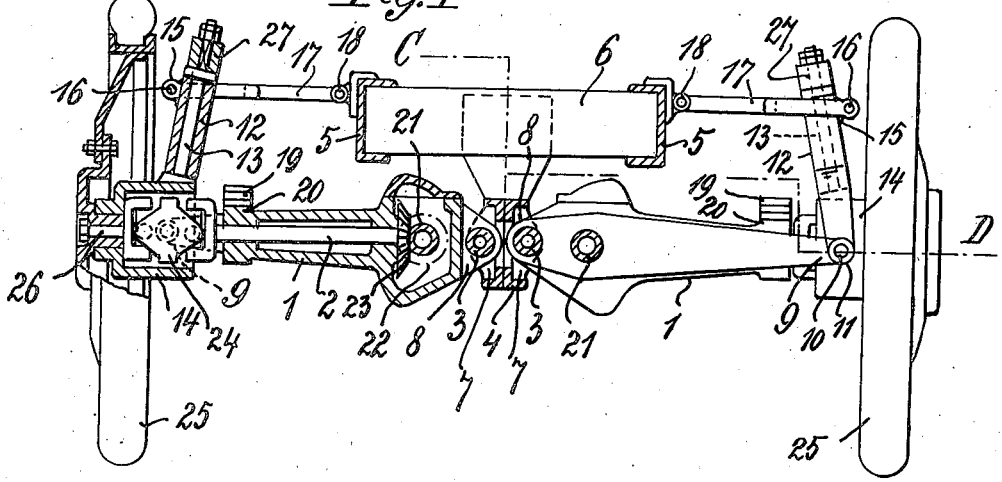
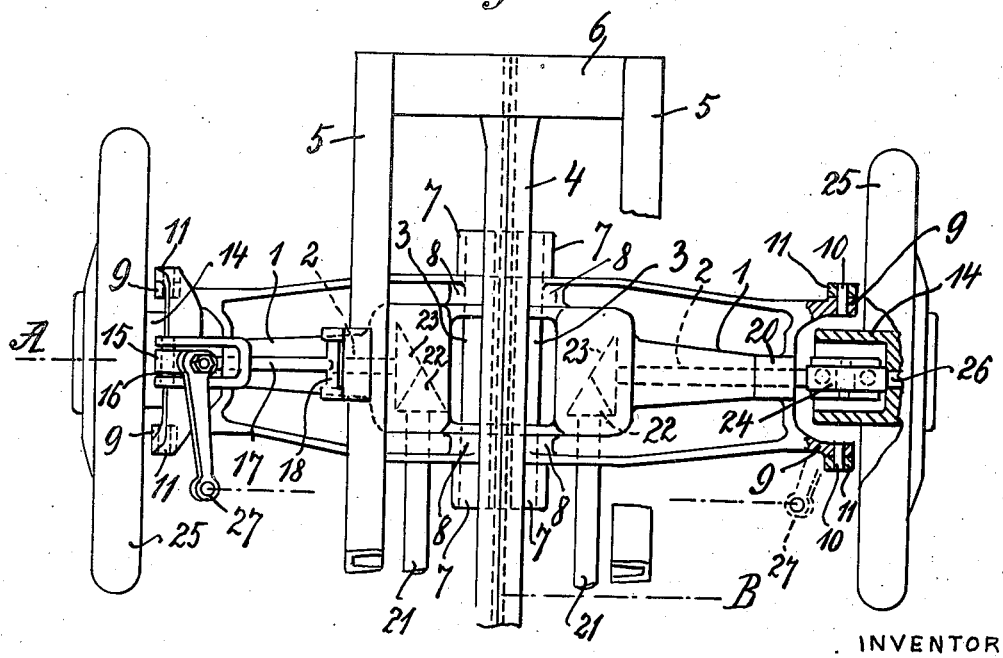
INVENTOR
ZSIGMOND HOLLÓS
By Young, Emery & Thompson
ATTORNEYS Patented Apr. 9, 1940

2,196,556

UNITED STATES PATENT OFFICE 2,196,556

VEHICLE AXLE SUSPENSION

Zsigmond Hollós, Vienna, Austria

Application July 6, 1937, Serial No. 152,258
In Austria July 10, 1936

7 Claims. (Cl. 180—73)

This invention relates to the suspension of driving axle assemblies embodying oscillating half-axles, on road and cross-country vehicles and the like, with or without steering swivels on the outer ends of the half-axles, and has for its main object to provide an improved suspension for axles of this description admitting of extremely rugged construction, and whereby the wheel track of the driving wheels remains substantially unaltered at all oscillating positions of the half-axles, and that without sacrifice of ground clearance. Other purposes and advantages of the invention will become apparent in the course of the ensuing description.

In order to prevent the alteration of the effective wheel track resulting from the oscillatory movement of the pivoted half-axles in known types of construction of oscillating half-axle assemblies including those in which the oscillating half-axles are mounted between parallel rockers it has already been proposed to support the articulated shaft that drives each wheel between an upper and a lower rocker the points of articulation of which to the frame of the vehicle and to the wheel bearing constitute the corners of a trapeze of links. The purpose aimed at is achieved in this manner, but at the cost of the ground clearance of the vehicle.

I also make use of the principle of a trapeze of links for the suspension, but in the case of my construction the oscillating half-axle itself, that is to say the axle housing together with the driving shaft and its accessories, which, in consequence of its pivotal mounting independently of the differential gearing, admits of the utilization of the full half of the wheel track for the oscillating movement, forms the base of the trapeze, while the opposite member of the trapeze is formed of a rocker which is shorter than the half-axle and which is articulated at its inner end to the frame of the vehicle. It is already known to connect oscillating half-axles by means of a link to the end of a spring centrally secured to the frame of the vehicle above the axle, but in this case the spring can not be considered to be a shorter side of the trapeze of links than that formed of the half-axle, and consequently the desired result, namely the preventing of widening of the wheel track ("straddling" of the wheels) when the half-axles oscillate upwards, is not achieved.

The invention relates further to particular features of the construction of the oscillating half-axles themselves which are bifurcated both at the inner end and at the outer end to strengthen them for the taking up of thrust forces. When the driving wheels are also required to serve as swivelled wheels for steering purposes there is provided a sleeve which is pivotally connected at the lower end by means of a forked extension to the end of the steering swivel journal, and beyond which the steering pin upwardly projects, so that the steering lever or arm can be disposed clear of the range of oscillating movement of the half-axle.

A form of construction embodying the invention is shown, by way of example, in the accompanying drawing, in which:

Fig. 1 is a vertical section of part of a vehicle taken on the line A—B of Fig. 2.

Fig. 2 is a plan view of the same, partly in section on the line C—D of Fig. 1.

Referring to the drawing, the oscillating half-axle housing 1 contain the wheel driving shafts 2 and are pivoted about pins 3 to the longitudinal middle frame member 4 which is connected to the side members 5 of the frame of the vehicle by means of transverse members 6. The pin 3 consists of a length of tube the ends of which are supported in the relatively widely spaced bearings 7 provided in the longitudinal middle frame member 4, and which also passes through the eyes 8 in the forked inner end of the oscillating half-axle casing. This casing has at its outer end eyes 9 which are connected by pins 10 with the eyes 11 in the forked extension of a sleeve 12 so as to be rotatable relatively thereto. In this sleeve 12 there is rotatably mounted the slightly inwardly tilted and upwardly extending steering swivel journal 13 pertaining to the hollow swivelling stub axle 14. This sleeve is also provided near its upper end with an eye 15 by which it is pivoted, by means of a pin 16, to the outer forked end of the rocker or lever 17 the inner end of which is pivoted by means of a pin 18 to the longitudinal frame member 5. The pins 10 and 16 constitute the knuckles and the pins 3 and 18 the points of articulation of the trapeze of links forming the suspension. The connecting link formed of the sleeve 12 and pivot pin 13 constitutes the one arm of a bell-crank lever the other arm of which consists of the stub axle 14. When the wheels are not required to swivel for steering purposes the stub axle 14 constitutes, with the lever arm interconnecting the pins 10 and 16, a rigid bell-crank lever. The longitudinal frame members 5 rest with the springs 19 upon the supporting surfaces or platforms 20 on the housings of the oscillating half-axles. The drive is transmitted to the wheels by the shafts 21 which rotate the wheel driving shafts 2 through the intermediary of bevel gears 22, 23, while the shaft 2 transmits its drive through a universal joint 24 to a trunnion 26 supported in the hollow stub axle 14 and connected to the wheel 25. At the end of the steering swivel journal 13 there is secured, above the rocker forming the upper member of the trapeze of links, a steering arm 27 which is coupled in a known manner to the steering gear not shown in the drawing, and which, in consequence of its elevated position is protected from damage.

Although the described example of the embodiment of the invention has been to driving wheels swivelled to serve as steering wheels, the suspension forming the subject proper of this invention is, as will readily be understood, equally applicable to non-swivelled driving wheels, and to non-driven wheels, and is not to be considered as restricted to the above example.

I claim:

1. In a wheeled motor vehicle the combination with an undercarriage, of independent suspension assemblies, one for each of the wheels, each said assembly consisting of a half-axle housing articulated to said undercarriage adjacent the longitudinal mid-plane thereof for pivotal movement in a vertical plane with respect to said undercarriage while being inherently rigid in every other direction, a spring mounted on the upper part of the housing to support the undercarriage, a track wheel with stub axle mounted at the outer end of said housing, a rocker member shorter than said housing articulated to said undercarriage above said housing and extending outwards, a floating link end member articulated to the outer end of said housing and of said rocker member, transmission gearing in said housing, and an axle shaft connecting said gearing with said stub axle, said assembly thus constituting a trapeze of link members of which the lowermost is said half-axle housing itself, and said housing being articulated to said undercarriage by a pivot joint whereby said housing is capable of taking up all stresses imposed upon the same during the operation of the vehicle.

2. A wheel suspension assembly as claimed in claim 1 in which said stub axle is swivellably mounted to make said track wheel a steering wheel, and in which said end member is of hollow construction and accommodates a steering head journal connected at the lower end to said stub axle, the outer end of said housing being provided with a jaw to allow of swivelling movement of said stub axle, and further comprising a universal joint between the outer end of said propeller shaft and said stub axle.

3. A wheel suspension assembly as claimed in claim 1 in which said stub axle is swivellably mounted for steering purposes, and in which said end member is of hollow construction extending upwards beyond the level of the top of said assembly, and further comprising a steering head journal accommodated within said hollow end member and connected at the lower end to said stub axle, and steering gear connected to the upper end of said journal and disposed clear of said suspension assembly, the outer end of said housing being provided with a jaw to allow of swivelling movement of said stub axle, and said assembly further comprising a universal joint interposed between the outer end of said propeller shaft and said stub axle.

4. A wheel suspension assembly as claimed in claim 1, in which a pivot pin is provided in said end member and is integral with said stub axle and comprises therewith a bell-crank lever.

5. A suspension and driving system for a wheel on a vehicle frame, comprising a member having a bearing for the wheel, an axle casing adapted to be pivoted at one end adjacent the center of the vehicle frame and having a driving half-axle shaft for the wheel, a transverse arm adapted to be pivoted on the frame at one end above said axle casing at a point nearer the wheel than said pivotal point of the axle casing, a coupling means for the half-axle shaft to the wheel, and means for pivotally connecting the other ends of said axle casing and transverse arm to the member having the bearing for the wheel, in such manner that the wheel is suspended relatively to the frame and can be driven through the coupling means from the axle-shaft, the axle casing having a forked inner end forming two widely spaced bearings about which said axle casing is pivoted, the outer end of the axle casing also being forked to form two bearings by which it is pivoted to the connecting means which are also pivotally connected to the upper transverse arm, the connecting means consisting of a sleeve and a swivel journal connected to the bearing member, and the lower end of said sleeve being forked to form two bearings coacting with the bearings at the outer forked end of the axle casing.

6. In a wheeled motor vehicle the combination with an under-carriage, of independent suspension assemblies, one for each wheel, each assembly comprising a housing articulated at one end to the under-carriage adjacent the longitudinal mid-plane thereof for pivotal movement in a vertical plane with respect to said under-carriage while being inherently rigid in every other direction, an axle shaft mounted in said housing, a stub axle mounted as a swivel at the other end of the housing and connected to the wheel and the axle shaft so that the wheel may be steered, a rocker member shorter than said housing articulated to said under-carriage above said housing and extending outward, a floating link end member articulated to the other end of the housing and to the rocker member, said assembly constituting a trapezium of link members and said housing being articulated to the under-carriage by a pivot joint whereby the housing is capable of taking up all stresses imposed upon the same during the operation of the vehicle, a steering head journal connected at the lower end to the stub axle and pivoted in the end member, the said other end of the housing being provided with a jaw to permit swivelling movement of the stub axle, and a universal joint between the stub axle and the axle shaft.

7. An assembly according to claim 6, in which the housing is provided with a jaw to permit swivelling action.

ZSIGMOND HOLLÓS.